United States Patent
Saretzky

[15] 3,689,787
[45] Sept. 5, 1972

[54] PERMANENT MAGNET MOTOR HAVING POLE SHOE ROTOR WITH LAMINATIONS TO RETARD EDDY CURRENTS

[72] Inventor: Simon Saretzky, Harbor Road, Harbor Point, N.Y. 11050

[22] Filed: March 22, 1971

[21] Appl. No.: 126,429

[52] U.S. Cl. ............................................. 310/266
[51] Int. Cl. ............................................. H02k 1/22
[58] Field of Search........... 310/49, 67, 105, 154, 266

[56] References Cited

UNITED STATES PATENTS

| 3,519,859 | 7/1970 | Morreale | 310/266 |
| 3,500,081 | 3/1970 | Drejza | 310/49 |
| 3,469,124 | 9/1969 | Willcox | 310/266 |
| 3,549,923 | 12/1970 | Kurankin | 310/266 |
| 3,466,476 | 9/1969 | Snowdon | 310/266 |
| 3,532,916 | 10/1970 | Fisher | 310/266 |

Primary Examiner—J. D. Miller
Assistant Examiner—R. Skudy
Attorney—Herzig & Walsh

[57] ABSTRACT

A permanent magnet motor particularly adapted as a stepper motor. It is of a low inertia type having an axially polarized permanent magnet and wherein the feature of an axial air gap between a rotor and the magnet is embodied. The rotor provides the axial air gap. It is in the form of a low reluctance body having a peripheral part of laminated construction to improve pulsed stepping operation by minimizing deleterious effects caused by eddy currents.

7 Claims, 4 Drawing Figures

PATENTED SEP 5 1972

3,689,787

INVENTOR.
SIMON SARETZKY
BY
Herzig & Walsh
ATTORNEYS

PERMANENT MAGNET MOTOR HAVING POLE SHOE ROTOR WITH LAMINATIONS TO RETARD EDDY CURRENTS

SUMMARY OF THE INVENTION

This invention relates to an improved permanent magnet motor particularly adapted for use as a stepper motor designed to be pulsed in discrete steps. In an exemplary form of the invention, in the form of a synchronous stepper motor, it may be designed to have 200 discrete steps having a magnitude of 1.8°. The invention, however, may be embodied in constructions having other numbers of steps. The invention is an improvement on motors of the type of U.S. Pat. No. 2,428,837 and application Ser. No. 872,923, filed Oct. 31, 1969, now U.S. Pat. No. 3,603,826, and the disclosures of the patent and application are hereby incorporated herein by reference.

BACKGROUND OF THE INVENTION

The patent referred to and the application provided a permanent magnet motor with an axially polarized magnet; a preferred flux circuit; a non-rotating permanent magnet and the concept of an axial air gap. Improvements in the operation of stepper motors were realized.

Magnet materials through which magnetic flux is conducted tend to experience internally induced circulating currents as the flux changes. These circulating currents, known as eddy currents, produce flux which impedes the buildup of the main flux and also dissipate otherwise useful power. Eddy currents increase with increasing rates of flux changes. One way of minimizing their effects is shown in application Ser. No. 872,923, filed Oct. 31, 1969, now U.S. Pat. No. 3,603,826.

A well known method for reducing the effects of eddy currents is by the use of thin laminations of magnetic material which are insulated from each other both magnetically and electrically when they are stacked together to form the total length of the required magnetic structure. The use of laminations is a standard procedure in motor design and increases the efficiency of motors which use radial air gaps and flux paths which move rotatably about the axis of rotation of the motors rotating member (rotor) and interact with it.

In the stepper motor of U.S. Pat. No. 3,428,837 and patent application Ser. No. 872,923, now U.S. Pat. No. 3,603,826, two flux fields and two flux paths exist. A steady state d.c. flux emanates from the permanent magnet and moves axially along the length of the magnet, radially through the toothed rotor and the stator, axially along the housing to the end cap where it re-enters the magnet. A pulsating d.c. flux moves around the stator, in phase with input pulses which are supplied by an external pulse source. This flux moves rotatably about the axis of rotation of the motor's rotating element (rotor) and interacts with it.

The ability of the pulsating flux to build up to a maximum each time the motor is pulsed is very important as is its ability to fully respond to rapid pulses. Impending fluxes caused by eddy currents slow the build up of the pulsating flux and keep it from reaching its maximum potential value.

Making the toothed rotor from laminated magnetic material helps to solve the problems induced by eddy currents, but does not improve the performance of the unit because the laminations cause a drastic reduction in the steady state flux.

Since the most efficient operation of the stepper motor is achieved when the strength (flux density) of the steady state and pulsating d.c. fluxes are maximized, it is important to provide a method to maintain both fluxes at their maximum values.

In the specific case of the low inertia rotor of U.S. Pat. No. 3,603,826, the steady state flux moves axially along the magnet across the air gap separating the magnet from the inside face of the toothed rotor and radially through the rotor. Air represents an extremely high reluctance (resistance) path to the flux flow and is avoided whenever possible.

U.S. Pat. No. 3,603,826 which covers a low inertia rotor for a stepper motor introduced the concept of the axial air gap which reduces the number of air gaps which flux must traverse in a motor of the type discussed here. If the rotor were constructed only of laminations, the steady state flux would be faced with a large number of air gaps (the separation between each lamination) each of which would decrease the flux available for motor operation, plus one radial and one axial gap. The interface between laminations is a high reluctance path comprised of air and/or high dielectric material, as is obvious.

The detrimental effect which steady state flux experiences when laminations are used to minimize eddy currents effects and enhance the pulsating flux may be overcome by the use of a soft iron, low reluctance, rotor lamination support. This support acts as a low reluctance flux path and flux distributor for the steady state flux. When one considers that the "motor action" and main eddy current manifestations take place in the rotor teeth, the full significance of the design can be seen, as described in detail hereinafter.

The herein invention provides a laminated, toothed rotor which will have a maximum pulsating flux carrying capability because eddy currents are minimized; at the same time, a maximum steady state flux will be available at the rotor teeth because the air gaps and high reluctance paths for the steady state flux flow have been reduced to a minimum. The realization of these capabilities is a primary object of the invention.

In an exemplary embodiment of the invention, this object and others are realized by way of a particular rotor construction and relative arrangement of the stator, rotor, and motor housing. The motor includes a permanent magnet cylinder which is axially magnetized. Only one pole shoe is provided and it constitutes the rotor. It has a skirt of approximately the same axial length as the axial dimension of the stator pole faces and peripheral teeth are provided on it. The magnet cylinder is mounted from an end cap of the housing and does not rotate. The permanent magnet field is through a stator pole, through the rotor, through the magnet, and through part of the motor housing. The rotor body is solid forming a low reluctance path while the peripheral part is of laminated construction. A further object is to realize the above stated object by way of this particular rotor construction.

BRIEF DESCRIPTION OF THE DRAWINGS

Further objects and additional advantages of the invention will become apparent from the following detailed description and annexed drawings wherein.

Figure 1:
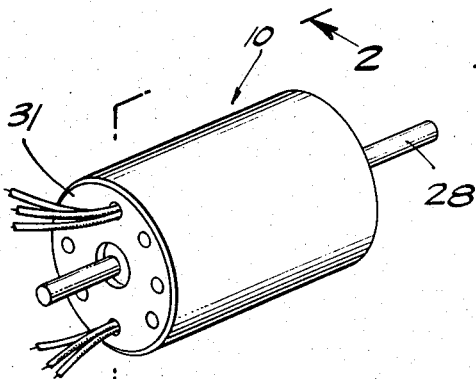
FIG. 1 is a perspective view of a stepper motor having the invention embodied therein.
Figure 2:
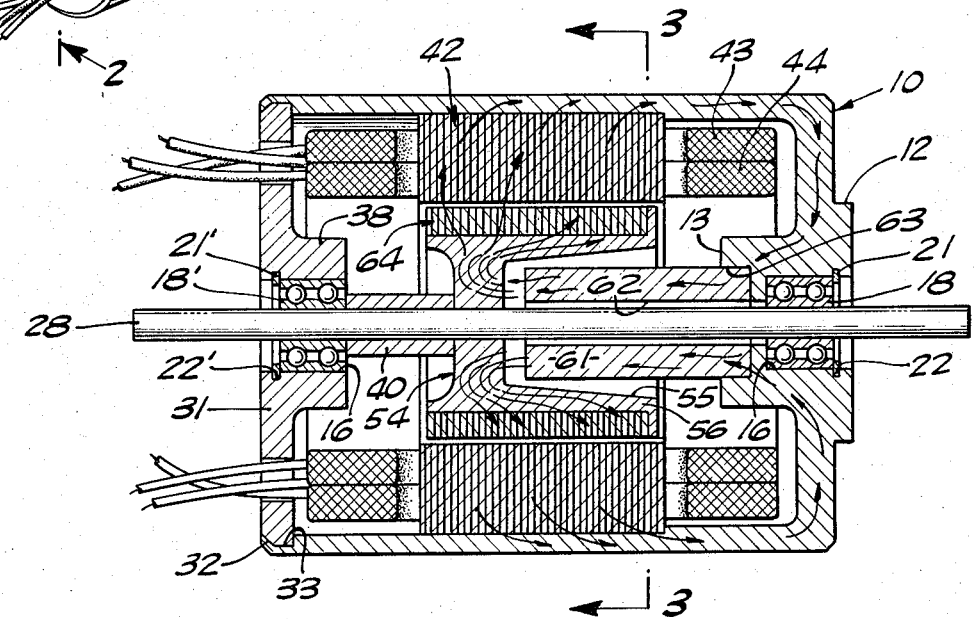
FIG. 2 is a cross-sectional view of a preferred form of the motor assembly of the invention; this figure being taken along line 2—2 of FIG. 1.

Referring now more in detail to FIGS. 1 and 2 of the drawing, the motor in the exemplary form shown comprises a generally cylindrical magnetically permeable housing 10. The right end of the housing has an extending boss 12 and an inwardly extending boss 13. In the end there is a bore 16 which receives a bearing designated generally at 18 which includes conventional ball races and balls. The ball bearing is held by snap ring 21 received in an annular groove 22 in the bore 16. Shaft 28 is journalled in bearing 18; and the other end bearing 18'.

At the other end of the motor housing 10 is an end cap 31 having an outer bevelled edge 32. It is received in a counterbore 33 in the end of housing 10. The end cap 31 has an inwardly extending boss 38 in which is received a second ball bearing 18' having conventional ball races and balls. The ball bearing is held in place by a snap ring 21' received in an annular groove 21' in the bore 16' in the end cap 31. Numeral 40 designates a cylindrical non-magnetic spacer member which fits between bearing 16' and the rotor.

Referring to the stator assembly, it is of laminated construction, as designated generally at 42 in the figures. It comprises a cylindrical structure fitting within the housing 10 and having inwardly extending poles of which there may be eight for example as in U.S. Pat. No. 3,428,837. The poles have enlarged end faces which are accurate and positioned adjacent the periphery of the rotor. The pole faces have axial teeth; in the construction shown, each pole face has five teeth with four spaces between the teeth, as in U.S. Pat. No. 3,428,837 and the windings may be the same as in that patent, which as stated is incorporated herein by reference to illustrate in part an exemplary embodiment of the herein invention windings are as shown at 43 and 44.

The rotor is designated by the numeral 54 mounted on shaft 28. It has a bore 55 forming skirt 56 which has an inside taper as shown. The permanent magnet cylinder 61 has a bore 62 through which the shaft 28 passes. As may be seen the end of magnet 61 is within pole shoe 54 which is the rotor and the other end of magnet 61 is supported in counterbore 63 in boss 13. The magnet could be supported by either an end cap or the housing. The magnet is axially polarized. The permanent magnetic circuit is like that of U.S. Pat. No. 3,428,837. An axial air gap is between the end of magnet 61 and rotor 54.

The rotor 54 with its skirt has substantially the same axial extent as the axial extent of the stator pole faces. The magnet 61 is displaced axially from the stator poles. The rotor 54 rotates within the stator poles. The boss 13 is part of the magnetic motor housing. There is only one pole shoe. The body of the rotor 54 is of solid, low reluctance, material allowing a low reluctance path. The peripheral circumferential part 64 is of laminated construction of suitable material. The laminations are rings secured to the body.

Figure 3:
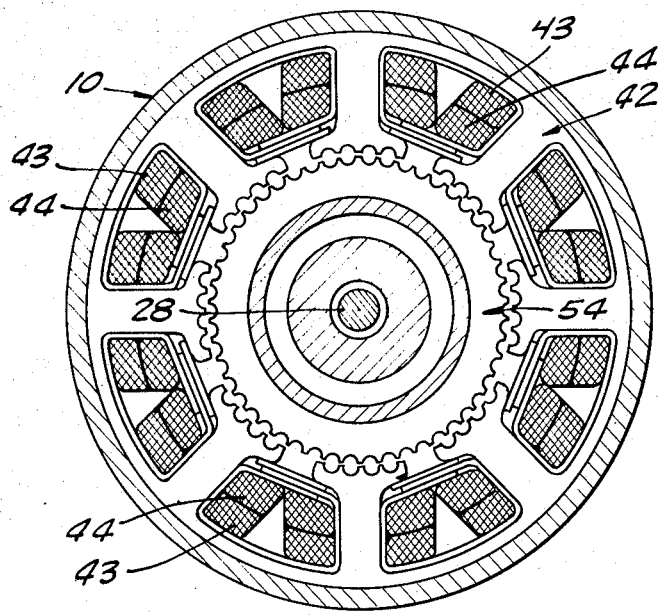
FIG. 3 is a sectional view taken along line 3—3 of FIG. 2.
Figure 4:
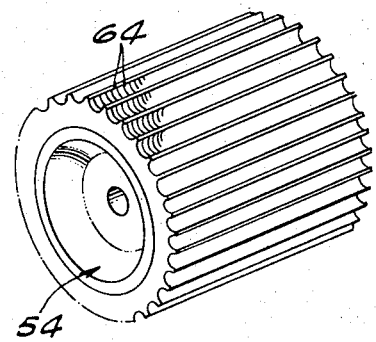
FIG. 4 is a perspective view of the rotor.

The pole shoe (i.e.) rotor 54 has peripheral teeth similar to those on the faces of the stator poles. See FIGS. 3 and 4. It has fifty such teeth evenly spaced on the outside diameter. The arrangement of stator poles and numbers of teeth may be as in U. S. Pat. No. 3,428,837.

The field produced by the windings is typical having of course a radial part through the poles. This field is pulsed and rotated depending on the pulsing frequency.

The operation has been explained and will be understood from the description. The impeding effects of eddy currents on the pulsating flux are avoided without reduction of steady state flux.

From the foregoing those skilled in the art will readily understand the nature of the invention and the manner in which it achieves and realizes all of the objects and results as set forth in the foregoing. It is apparent that the impeding influence of eddy currents has been very substantially reduced. The capability of the motor to be pulsed rapidly and accurately has been enhanced.

The foregoing disclosure is representative of a preferred form of the invention and is to be interpreted in an illustrative rather than limiting sense.

What is claimed is:

1. A rotor and stator assembly comprising a laminated core assembly having poles with windings thereon, a shaft having a cup-shaped rotor thereon, a cylindrical permanent magnet secured to the housing and extending into said cup-shaped rotor, said rotor having a part positioned to rotate adjacent surfaces of the stator poles and adjacent said permanent magnet, the rotor having a body part of material offering a low reluctance path, the body part being cylindrical and having ring-shaped laminations secured around the periphery thereof and coextensive therewith.

2. A structure as in claim 1 wherein said magnet is axially magnetized and positioned to provide a steady state field through itself the rotor and a part of a housing.

3. A structure as in claim 1 wherein the rotor has a skirt concentrically positioned between the stator pole faces and the permanent magnet, providing an axial air gap between an end of the magnet and the rotor.

4. A structure as in claim 1 wherein the said permanent magnet is displaced axially from the stator poles, and a housing having a part supporting the permanent magnet.

5. A structure as in claim 1 wherein said pole faces have teeth formed therein and said rotor has peripheral teeth rotatable adjacent the teeth on the pole faces.

6. A structure as in claim 4 wherein said permanent magnet is cantilever mounted from said housing.

7. A rotor and stator assembly comprising a laminated core assembly having poles with windings thereon, a shaft having a cup-shaped rotor thereon, a cylindrical stator member secured to the housing and extending into said cup-shaped rotor, said rotor having a part positioned to rotate between said poles and said cylindrical stator member, said rotor having a body part of material offering a low reluctance path and the peripheral part of the rotor including laminations positioned around the periphery thereof and coextensive therewith.

* * * * *